United States Patent

Anderson et al.

[15] 3,667,021
[45] May 30, 1972

[54] SERIES MOTOR CONTROL CIRCUIT USING THYRISTORS ENERGIZED BY DIRECT CURRENT

[72] Inventors: Albert W. Anderson; Charles E. Konrad, both of Roanoke, Va.

[73] Assignee: General Electric Company

[22] Filed: Sept. 11, 1970

[21] Appl. No.: 71,317

[52] U.S. Cl. ............................................318/341, 321/45 C
[51] Int. Cl. ..............................................................H02p 5/16
[58] Field of Search ....................318/341, 345; 307/252.55; 321/45 C

[56] References Cited

UNITED STATES PATENTS

| | | | |
|---|---|---|---|
| 3,594,629 | 7/1971 | Kawakami | 318/345 |
| 3,150,307 | 9/1964 | Kaeding | 307/252.55 |
| 3,242,352 | 3/1966 | Long | 307/252.55 |

FOREIGN PATENTS OR APPLICATIONS 1,180,833  11/1964  Germany.............................321/45 C

*Primary Examiner*—Bernard A. Gilheany
*Assistant Examiner*—Thomas Langer
*Attorney*—Arnold E. Renner, James C. Davis, Jr., Frank L. Neuhauser, Oscar B. Waddell and Joseph B. Forman

[57] ABSTRACT

A commutation control circuit for a motor including a power thyristor and an auxiliary thyristor for switching the power thyristor under control of a variable frequency pulse generator making use of a capacitor for commutation charged by a transformer, the charge on the capacitor being established to be ready for commutation whenever the power thyristor is gated, and the charging current being derived from a direct current source such as a lead/acid storage battery. The circuit specifically uses a positive pulse for causing conduction of the power thyristor and a negative pulse for switching the power thyristor "off."

6 Claims, 3 Drawing Figures

INVENTORS.
ALBERT W. ANDERSON
CHARLES E. KONRAD

SERIES MOTOR CONTROL CIRCUIT USING THYRISTORS ENERGIZED BY DIRECT CURRENT

BACKGROUND OF THE INVENTION

The ever-increasing demand for pollution-free vehicular transportation brings to focus electric vehicles having operating characteristics comparable with fossil-fueled vehicles of which the series, direct current driven, electric motor is exemplary. In order to conserve the portable batteries, which of necessity are required for such electric vehicles, speed controls are necessary that are devoid of conventional power consuming rheostats and the like. The sophistication of semiconductor power devices such as power thyristors has brought about extensive use of circuits embodying many versions of so-called "solid state" controls; for example, see "SCR Manual 4th Edition" by General Electric Company, Electronics Park, Syracuse, New York (Copyright 1967 by General Electric Company), particularly page 237.

Invariably the solid state controls mentioned above include multiple inverter, or "chopper," modifications using both "-time-ratio" and "pulse-width" regulation as for example in U.S. Pat. No. 3,335,351, "DC Motor Control Circuit," by H. E. Morris and assigned to the assignee of the present invention. A problem encountered in circuits of this type relates to the use of a capacitor under the control of the "switch-off" thyristor wherein the charge upon the capacitor leaks off prematurely due to induced potentials and back circuits.

SUMMARY OF THE INVENTION

The present invention overcomes these objectionable control features in the use of a capacitor under control of an auxiliary thyristor for switching "off" the power thyristor by providing a circuit wherein each time the power thyristor is "switched on," the capacitor is charged to a potential sufficient to "switch off" the power thyristor regardless of any previous charge or potential remaining on the capacitor. A feature of the invention is that the power thyristor is "switched on" by a positive pulse and "switched off" by a negative pulse.

DETAILED DESCRIPTION OF THE INVENTION

Figure 1:
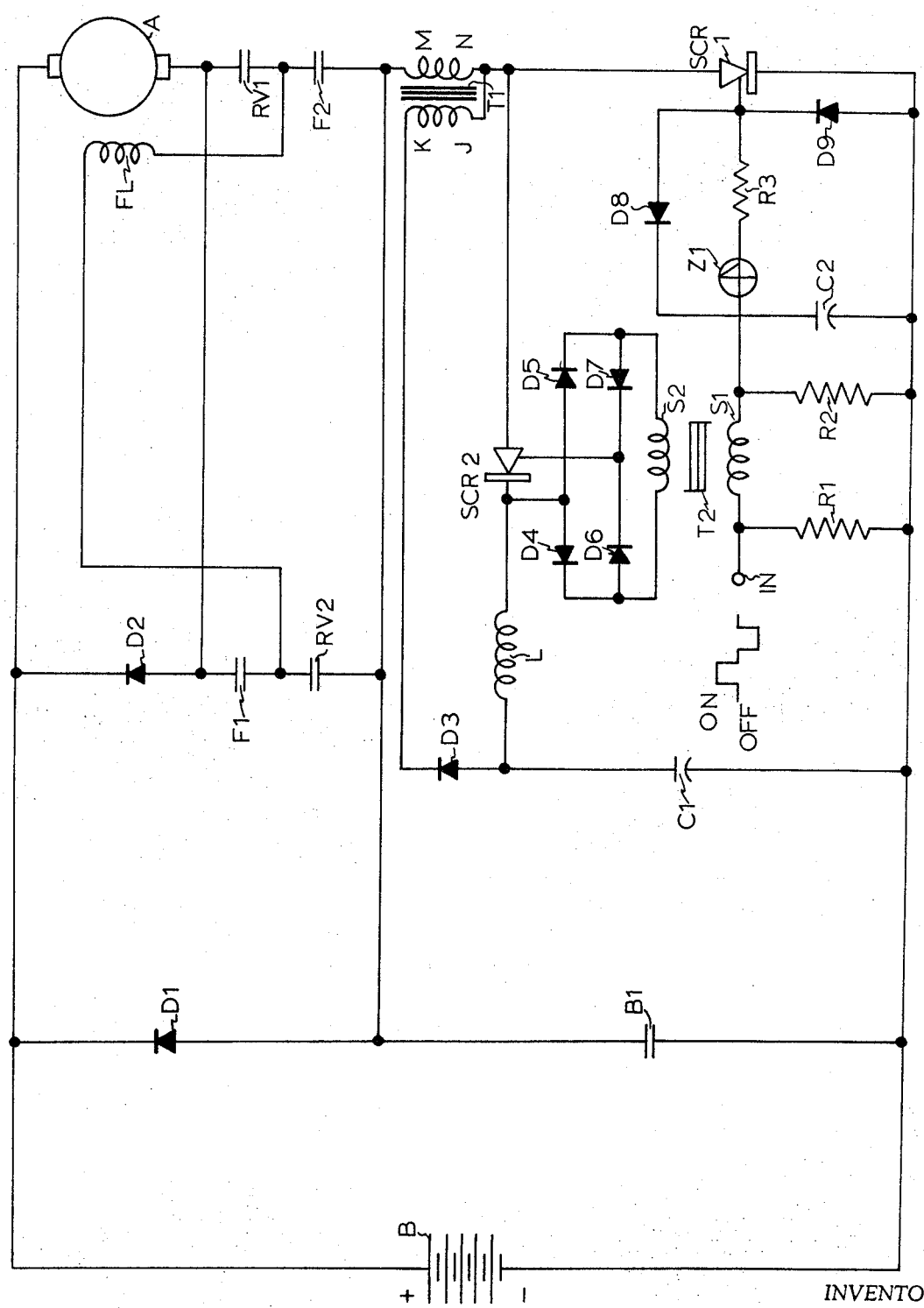
FIG. 1 is a circuit diagram of the principal features of the invention in a preferred embodiment.

Referring to FIG. 1 a series motor having an armature A and a field FL is provided to be energized from a battery B via a power thyristor SCR 1, the field FL being reversible by means of the contacts F1, F2 and RV1, RV2, all of these contacts being normally open. When both contacts F1 and F2 are closed, the motor armature A rotates in one direction, and when both contacts RV1 and RV2 are closed, the motor armature A rotates in the other direction. A commutating diode D1 is placed across the armature A and the field FL, and another commutating diode D2 is placed across the motor armature A. Another normally open contact B1 by-passes the power thyristor SCR1 in order to apply full battery voltage constantly to the motor.

The control portion of the circuit of FIG. 1 includes an auto transformer T1 having a primary MN in series with the power thyristor and the motor, the secondary JK of the transformer T1 being connected through a diode D3 for reverse charging of a capacitor C1, which has as its chief function the commutating of the power thyristor SCR 1. The capacitor C1 is charged initially via a circuit established from the battery B, motor armature A, field FL, either of the contacts F1, F2, or the contacts RV1, RV2, transformer primary MN, an auxiliary thyristor SCR 2, a choke L, the other side of the capacitor being connected to the other side of the battery B.

The gating circuits for the thyristors are shown in the lower right hand corner of the circuit, and it is to be noted that the gating input for both thyristors is terminal "IN" and the negative side of the battery B. A positive pulse applied at "IN" will gate both thyristors "ON," while a negative pulse applied at "IN" will gate thyristor SCR 2 "ON," but will have no direct effect upon thyristor SCR 1.

The input to the gate of thyristor SCR 2 is via the filter resistor R1 and the primary S1 of the transformer T2, the secondary S2 of the transformer T2 and the bridge rectifier comprising diodes D4, D5, D6 and D7, whereby either a negative pulse, or a positive pulse to the primary S1 will provide positive potential to the gate of thyristor SCR 2 to turn it "ON."

The input to the gate of thyristor SCR 1 is via the filter comprising resistor R1, primary S1 of transformer T2, resistor R2 to the capacitor C2, which, when fully charged, discharges through the unilateral switch Z1 and resistor R3 to provide positive potential to the gate of thyristor SCR 1 to turn it "ON." Diode D8 serves to protect Z1 against reverse voltage, and diode D9 serves a similar function for the gate/base of thyristor SCR 1. Only a positive pulse to the "IN" terminal will cause thyristor SCR 1 to conduct.

Figure 2:
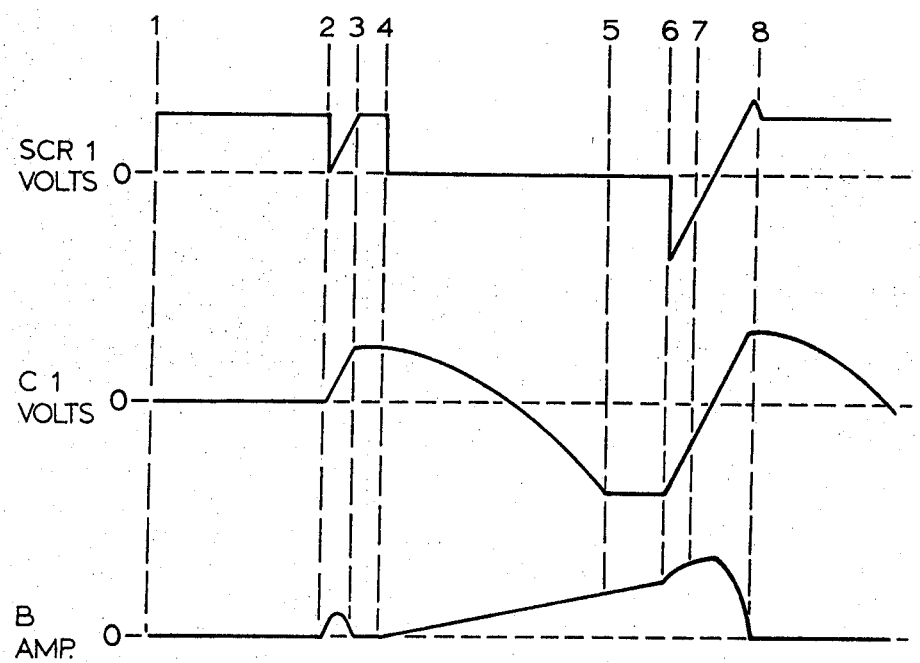
FIG. 2 illustrates the various values and conditions of the operation of the circuit in respect to time voltages upon the power thyristor and the commutating capacitor and load current (battery current).

Referring now to FIG. 2 in respect to the numerical designations at the top of the figure, which represent time: At time "1" the contacts F1, F2, or RV1, RV2, close. At "2" a positive control pulse via the "IN" terminal gates thyristor SCR 2 "ON" charging capacitor C1 to battery potential (the upper plate of the capacitor as in FIG. 1 being positive). At "3" thyristor SCR 2 turns "OFF" as a result of there being insufficient current between its anode and cathode to maintain conduction — capacitor C1 being fully charged. At "4" the transformer T2 becomes saturated and primary S1 permits the capacitor C2 to become charged, whereby thyristor SCR 1 is turned "ON," as explained above. Current now flows through the motor (armature A and field FL), the primary MN of transformer T1, and thyristor SCR 1, and the motor operates. The capacitor voltage of C1 drives the transformer T1 until C1 potential reaches "zero" and then primary MN drives the capacitor more negative. At "5" transformer T1 saturates (positive) and current in secondary JK reduces to zero, the diode D3 blocking discharge of the capacitor C1. At "6" a negative pulse gates thyristor SCR 2 "ON," as previously explained. Current in the circuit SCR 2, L, C1 increases, reducing current through SCR 1 and shutting "OFF" thyristor SCR 1.

At "7" current flows through motor (armature A, field FL), primary MN of transformer T1, SCR 2, L and C1 maintaining negative bias on SCR 1 to place the latter in full blocking mode and transformer T2 saturates, putting negative bias on gate of SCR 1 — assisting its blocking function.

At "8" current continues to flow via D3, primary MN, SCR 2, L, C1 (reverse current) until inductive energy is converted to capacitative energy whereupon battery current reduces to "zero" and SCR 2 turns "OFF." The voltage on C1 thereafter decays via D3, secondary JK, primary MN and D1.

Figure 3:
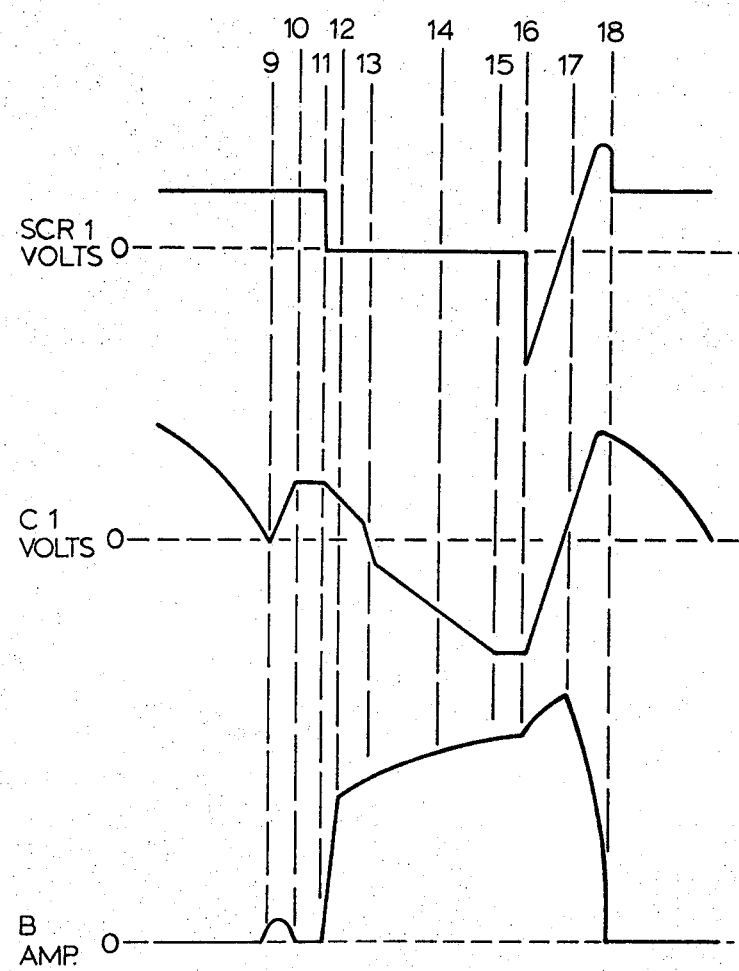
FIG. 3 is similar to FIG. 2; however, the values and conditions shown represent operation under partial power.

With reference to FIG. 3, similar conditions exist, as follows:

"9" Positive pulse into transformer T2 gates SCR 2, charging C1 to battery potential — if the capacitor potential is less than battery voltage.

"10" SCR 2 turns "OFF."

"11" Transformer T2 saturates. Current through primary S1 charges C2 until unilateral switch Z1 conducts, gating SCR 1 "ON." Capacitor C1 drives the transformer T1 and current flows backwards through D1, primary MN, and SCR 1.

"12" Current in primary MN equals motor current and current in D1 is "zero." Current flows through motor (armature A and field FL), primary MN, SCR 1 with capacitor C1 driving until transformer T1 saturates in negative direction.

"13" Capacitor C1 discharges through D3, secondary JK, SCR 1 converting stored energy in capacitor into inductive energy and then returning the inductive energy to the capacitor (top plate of FIG. 1 charged negative).

"14" Current through primary MN drives transformer, charging C1.

"15" Transformer T1 saturates in positive direction, current in secondary JK reducing to "zero" and D3 blocks.

"16" Negative pulse gates SCR 2. Current in SCR 2, L, C1 circuit increases, reducing current through SCR 1, shutting "OFF" SCR 1.

"17" Current flows through motor (armature A, field FL), primary MN, SCR 2, L and C1, maintaining negative bias on SCR 1 to put it in blocking mode. Transformer T2 saturates, putting negative bias on gate of SCR 1 to further enhance its blocking mode.

"18" Backward current continues to flow via D1, primary MN, SCR 2, L and C1 until inductive energy is converted to capacitative energy when battery current reduces to "zero" and SCR 2 turns "OFF." Voltage on C1 decays via D3, secondary JK, primary MN and D1.

The circuit of FIG. 1 is adapted to be used with a square wave pulse generator (not shown) which may be a conventional "flip-flop," or "trigger" having a variable time rate control, the output of the "trigger" being fed to the "IN" terminal. A multivibrator may also be used wherein the variable time rate may be obtained per se. In other words any source of controlled positive and negative pulses may be used to effect the control function described above provided that substantially "square" wave pulses are obtained.

What is claimed is:

1. A controlled, commutating circuit for a power thyristor including a commutating capacitor, an auxiliary thyristor, and circuit means connected to said power thyristor and to said auxiliary thyristor operative to render each of said thyristors selectively conductive; said circuit means responsive to a signal of a first identity applied in an input thereof for rendering said auxiliary thyristor conductive to charge said capacitor in a first direction and for rendering said main thyristor conductive after an identifiable period to reverse the charge on said capacitor, and responsive to a signal of a second identity applied to said input to render only said auxiliary thyristor conductive to thereby utilize the reverse charge on said capacitor to switch said main to a non-conductive state.

2. The invention set forth in claim 1 including the provision of positive pulse means for initiating conduction of said power thyristor and negative pulse means for initiating non-conduction of the power thyristor.

3. The invention according to claim 1 wherein the said circuit means includes an auto transformer capable of saturation.

4. The invention according to claim 1 wherein the said circuit means includes a saturable transformer for initiating the conduction of the auxiliary thyristor prior to initiating conduction of the power thyristor under control of a positive pulse.

5. The invention according to claim 1 wherein the said circuit means includes control means for preventing initiation of conduction of said power thyristor when said auxiliary thyristor's conduction is initiated under control of a negative pulse.

6. The invention in accordance with claim 1 wherein the signals are of relatively opposite polarity.

* * * * *